(12) United States Patent
Pion

(10) Patent No.: US 10,298,139 B2
(45) Date of Patent: May 21, 2019

(54) SWITCHING POWER SUPPLY WITH A VERY WIDE DYNAMIC RANGE FOR MEASURING INSTRUMENTS

(71) Applicant: CHAUVIN ARNOUX, Paris (FR)

(72) Inventor: Francisque Pion, Chapeiry (FR)

(73) Assignee: CHAUVIN ARNOUX, Paris (FR)

( * ) Notice: Subject to any disclaimer, the term of this patent is extended or adjusted under 35 U.S.C. 154(b) by 0 days.

(21) Appl. No.: 15/737,340

(22) PCT Filed: Jun. 15, 2016

(86) PCT No.: PCT/FR2016/051440
§ 371 (c)(1),
(2) Date: Dec. 18, 2017

(87) PCT Pub. No.: WO2016/203148
PCT Pub. Date: Dec. 22, 2016

(65) Prior Publication Data
US 2018/0191257 A1 Jul. 5, 2018

(30) Foreign Application Priority Data
Jun. 16, 2015 (FR) ..................... 15 55470

(51) Int. Cl.
*H02M 3/335* (2006.01)
*H02M 1/36* (2007.01)
(Continued)

(52) U.S. Cl.
CPC ......... *H02M 3/33576* (2013.01); *H02M 1/08* (2013.01); *H02M 1/32* (2013.01);
(Continued)

(58) Field of Classification Search
CPC ...... H02M 3/33576; H02M 1/08; H02M 1/14; H02M 1/32; H02M 3/33523;
(Continued)

(56) References Cited

U.S. PATENT DOCUMENTS 5,995,385 A 11/1999 Shimamura
9,001,533 B2 4/2015 Park et al.
(Continued)

FOREIGN PATENT DOCUMENTS

KR 20120136133 A 12/2012

OTHER PUBLICATIONS

International Search Report from PCT Application No. PCT/FR2016/051440, dated Sep. 29, 2016.
(Continued)

*Primary Examiner* — Jue Zhang
*Assistant Examiner* — Jye-June Lee
(74) *Attorney, Agent, or Firm* — Workman Nydegger

(57) ABSTRACT

A switch mode power supply comprises a power converter including a transformer having a primary winding connected to a primary circuit, and a secondary winding connected to a secondary circuit delivering an output voltage to a load. The primary circuit comprises a controller for operating a switch element to chop the current flowing in the primary winding to transfer energy selectively to the secondary winding. The secondary circuit comprises a storage capacitor delivering the energy to the load, a first regulator receiving the output voltage and delivering a first control current for the controller via an isolator element, and a second regulator receiving an auxiliary output voltage that is an image of the output voltage and delivering a second control current for the controller. The second control current is added to the first control current to avoid any interruption in the chopping of the current flowing in the primary winding.

10 Claims, 4 Drawing Sheets

(51) Int. Cl.
*H02M 1/08* (2006.01)
*H02M 1/32* (2007.01)
H02M 1/00 (2006.01)
H02M 1/14 (2006.01)

(52) U.S. Cl.
CPC ......... *H02M 1/36* (2013.01); *H02M 3/33523* (2013.01); *H02M 3/33561* (2013.01); *H02M 1/14* (2013.01); *H02M 2001/0022* (2013.01); *H02M 2001/0025* (2013.01); *H02M 2001/0032* (2013.01); *Y02B 70/16* (2013.01)

(58) Field of Classification Search
CPC ............... H02M 3/33561; H02M 1/36; H02M 2001/0025; H02M 2001/0032; H02M 2001/0022; Y02B 70/16
See application file for complete search history.

(56) References Cited

U.S. PATENT DOCUMENTS

| | | | | |
|---|---|---|---|---|
| 2004/0145922 | A1* | 7/2004 | Jutras | H02M 3/1588 363/18 |
| 2006/0066264 | A1* | 3/2006 | Ishigaki | H05B 41/282 315/291 |
| 2012/0314459 | A1 | 12/2012 | Park et al. | |
| 2016/0276821 | A1* | 9/2016 | Politis | H02H 3/00 |

OTHER PUBLICATIONS

French Search Report from FR Application No. 1555470, dated Apr. 28, 2016.

* cited by examiner

SWITCHING POWER SUPPLY WITH A VERY WIDE DYNAMIC RANGE FOR MEASURING INSTRUMENTS

FIELD OF THE INVENTION

The present invention relates to the field of switch mode power supplies for measuring instruments, and it relates more particularly to a power supply having a very large dynamic range compatible with both direct current (DC) and alternating current (AC) power supply networks.

PRIOR ART

A power supply is said herein to be of very large dynamic range when it is compatible with DC networks over the range 120 volts DC (Vdc) to 1600 Vdc or with AC networks over the range 85 volts AC (Vac) to 1150 Vac.

In a switch mode power supply, the voltage from an AC network is rectified and filtered, and it is then "chopped" at a frequency higher than the frequency of the network by a switch element so that the secondary voltage of the transformer providing isolation between the input and the output presents a substantially square waveform that is converted into a DC voltage by rectification and secondary filtering. This output DC voltage is regulated to the desired constant level by acting on the duty ratio of the switch element.

FIG. 4 shows a prior art switch mode power supply of flyback topology and operating in current mode at fixed frequency, referred to as "sinusoidal takeoff", from an AC network. In this configuration, capacitors C1 and C2 receiving the rectified mains have practically zero capacitance and serve essentially to provide electromagnetic compatibility (EMC). The energy storage reservoir C11 is thus placed on the secondary of the energy transformer THT (which has its secondary voltage rectified by a diode D11), and it needs to have capacitance that is sufficient (several millifarads (mF)) to absorb the ripple from the AC network. In known manner, the servo-control, which makes use of the current mode of the power supply, is performed by a proportional integral (PI) regulator Z9 having a time constant that is much longer than one mains half-period (for which purpose the capacitor C9 has large capacitance) and having its reference voltage given by the ratio of resistors R14 and R15 connected in series across the terminals of the load between the output and ground, with the reference current for the controller Z6 modulating the duration of conduction for the chopper transistor T1 being delivered by the regulator via the optocoupler Z8.

Although that standard power supply configuration generally gives satisfaction in normal operation, it suffers unfortunately from several limitations, in particular when operating unloaded or when starting, when, as shown in FIG. 5, the output voltage 10 can vary considerably, exceeding the setpoint value periodically, thereby leading to the chopping taking place intermittently as a result of successive stops and restarts of the controller Z6 (curve given reference 12). Likewise, in the event of a mains failure resulting in the absence of one of the phases of the AC network, or as shown in FIG. 6 at periodic passes through zero (at a mains alternation low as shown by the curve referenced 20 for rectified mains), the fact that the interruption of conduction through the transistor T1 at high level is extended over several chopping periods (curve referenced 22) leads to a stop in energy being taken off (curve referenced 24), thereby leading to erratic operation of the regulation and to audible noise.

Object and Definition of the Invention

The present invention proposes mitigating those drawbacks with a switch mode power supply that operates in stable manner in spite of its dynamic range being very large in terms both of voltage and of current. An object of the invention is also to propose a switch mode power supply that can accept as input either a DC network or an AC network, which may be single-phase or three-phase. Another object of the invention is to propose a switch mode power supply that is compatible with various types of configuration such as those known by the terms "flyback", "feed-forward", or "push-pull".

These objects are achieved by a switch mode power supply including a power converter, the power converter including a transformer having a primary winding connected to a primary circuit that receives an input voltage, and a secondary winding connected to a secondary circuit that delivers an output voltage to a load, said primary circuit comprising a managing controller for operating a switch element to chop the current flowing in said primary winding so as to transfer energy selectively to said secondary winding, said secondary circuit comprising a storage capacitor charged via a first rectifier diode and delivering to said load said energy transferred via said transformer, and a first regulator receiving said output voltage and delivering a first control current for said managing controller via an isolator element, the power supply being characterized in that it further comprises a second regulator receiving an auxiliary output voltage that is an image of said output voltage, the auxiliary output voltage being obtained across the terminals of a link capacitor having one end connected to said storage capacitor and having its other end connected to the cathode of a second rectifier diode having its anode connected to said secondary winding, and delivering a second control current for said managing controller, which second control current is added to said first control current, said second regulator being configured to avoid any interruption in the chopping of the current flowing in said primary winding.

With this structure, a switch mode power supply is obtained of "flyback", "feed-forward", or "push-pull" topology that operates in particularly stable manner in spite of potentially being connected to different power supply networks, and regardless of the failures to which it might be subjected, whether in its source or in its load.

Preferably, said first and second regulators are proportional and integral regulators, said second regulator having a time constant that is at least fifty times shorter than said first regulator.

Advantageously, said second regulator has a setpoint that is greater than the setpoint of said first regulator and that is determined so that it is never reached in normal operation.

Preferably, said auxiliary output voltage is also delivered to said first regulator instead of and replacing said output voltage.

In order to limit any drop in the output voltage, two diodes connected in series are arranged in parallel with said link capacitor, and in order to limit any rise in the output voltage, first and second transistors have their bases connected in series with a resistor, said first transistor being connected in parallel with said link capacitor via its emitter/collector junction, and the assembly formed by said resistor and the emitter/collector junction of said second transistor, which has its collector connected to its base, being connected in parallel with said storage capacitor.

In order to limit the power taken off during each alteration low with single-phase AC, or during a loss of phase in polyphase AC, there is provided a current takeoff circuit configured to reduce or zero the sum of the first and second control currents delivered to said managing controller when said input voltage is below a determined threshold.

Advantageously, said determined threshold is defined by a voltage divider bridge feeding the base of a transistor having its collector in series with a Schottky diode for taking off said control current while preventing any current reversal.

In order to ensure operating continuity in spite of losing a phase, there is provided a protection circuit delivering said input voltage from a polyphase energy distribution network having a neutral conductor via a diode rectifier bridge, said protection circuit having a star connection configuration, each of the branches of said star including in series a varistor and a protection thyristor, and the point where said branches are joined together being connected to said neutral conductor, likewise via a varistor and a protection thyristor connected in series.

BRIEF DESCRIPTION OF THE DRAWINGS

The characteristics and advantages of the present invention appear better from the following description made by way of non-limiting indication, and with reference to the accompanying drawings, in which.

DETAILED DESCRIPTION OF A PREFERRED EMBODIMENT

Figure 1:
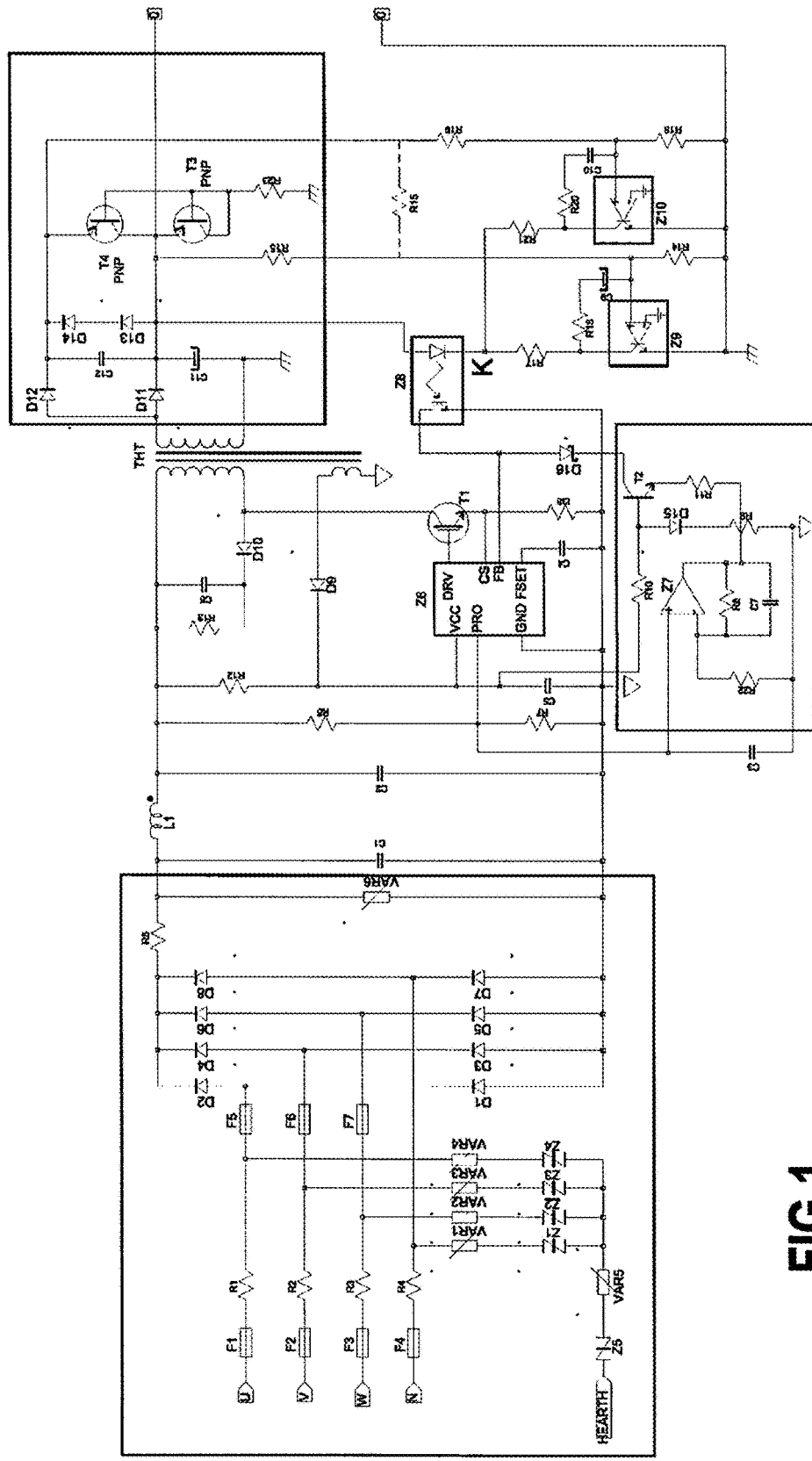
FIG. 1 shows an example of a switch mode power supply with very large dynamic range in accordance with the invention.

FIG. 1 shows a switch mode electrical power supply in accordance with the invention and thus compatible with all power supply networks, whether DC or AC, whether three-phase or single-phase, and accepting a very wide range of input voltages of 85 Vac to 1150 Vac and of 120 Vdc to 1600 Vdc. This dynamic range that is large in terms of input voltage and in terms of current makes implementing this type of power supply particularly complex, in particular because of the possibility of the power supply operating without a load.

As in the prior art structure, the switch mode power supply of the invention has flyback topology operating in current mode and at fixed frequency, referred to as "sinusoidal takeoff", from an AC network. The capacitors C1 and C2 connected to the mains as rectified by a protection circuit (and described in greater detail below), have almost zero capacitance and they serve essentially to provide electromagnetic compatibility (EMC). The energy reservoir (the storage capacitor C11) is placed on the secondary of the energy transformer THT (having its voltage rectified by the diode D11 connected to the secondary winding via its anode) and has capacitance that is sufficient to absorb the ripple from the AC network. The current servo-control of the power supply is provided by the proportional integral (PI) regulator Z9 and its time constant is much longer than one mains half-period, which regulator delivers, via the opto-coupler Z8, the setpoint current for the controller Z6 that modulates the duration of conduction for the chopper transistor T1.

Nevertheless, when the switch mode power supply is unloaded, the storage capacitor C11, which can be charged in a very short length of time via the rectifier diode D11, discharges very slowly since it is only the power supply's only power consumption that is taken from its output, and thus provides this discharge. Throughout the period of time in which the voltage on C11 is greater than the voltage produced by D11, chopping is therefore stopped by the regulation, and energy is no longer transferred to the secondary.

In the invention, the ability to regulate the switch mode power supply when unloaded is obtained by taking off the voltage that is to be regulated, not from the main output across the terminals of C11, but from an auxiliary output or "image" that is rectified by a diode D12 and filtered by a capacitor C12. It should be observed that to improve regulation during transient conditions, the negative electrode of the capacitor C12 is preferably connected to the cathode of the diode D11 rather than to ground. Specifically, the capacitor C12 then behaves as a link capacitor between a main output and an image output.

In addition, first and second transistors T4 and T3 have their bases connected in series with a resistor R23, the transistor T4 being connected in parallel with the capacitor C12 via its emitter/collector junction, and the assembly formed by the resistor R23 and the emitter/collector junction of the transistor T3 (having its collector connected to its base) is connected in parallel with the storage capacitor C11. Furthermore, two series-connected diodes D13 and D14 are arranged in parallel with the capacitor C12.

With this configuration, under certain conditions imposed by the diodes D13 and D14 and the assembly T3, T4, R23, if the image output is regulated, then the main output is also regulated. More particularly, the function of D13 and D14 is to prevent the image output from dropping below the main output by more than two diode thresholds, and the function of T3 and T4 is to prevent the image output from rising above the main output by more than a few hundreds of millivolts (mV).

Whereas conventionally, the servo-control of the main output relies solely on the regulator Z9, with the invention, this servo-control relies on two distinct regulators: the main regulator Z9 for the main output and an auxiliary regulator Z10 for the image output, with the current produced by these two regulators being summed at a summing node K. These two proportional integral (PI) regulators nevertheless have time constants that are very different (at a ratio that is greater than 50 and typically is of the order of 300 to 600), the main regulator having the slowness desired for operation with sinewave takeoff, and they are not set on the same setpoint, the setpoint for Z9 being lower than the setpoint for Z10, such that the auxiliary regulator does not operate under steady conditions, i.e. in the absence of transients. It should be observed that although reference is made above to voltage information for the main regulator Z9 coming from the main output, there is no reason why this information should not be taken from the auxiliary output (dashed line connection shown in FIG. 1).

Figure 2:
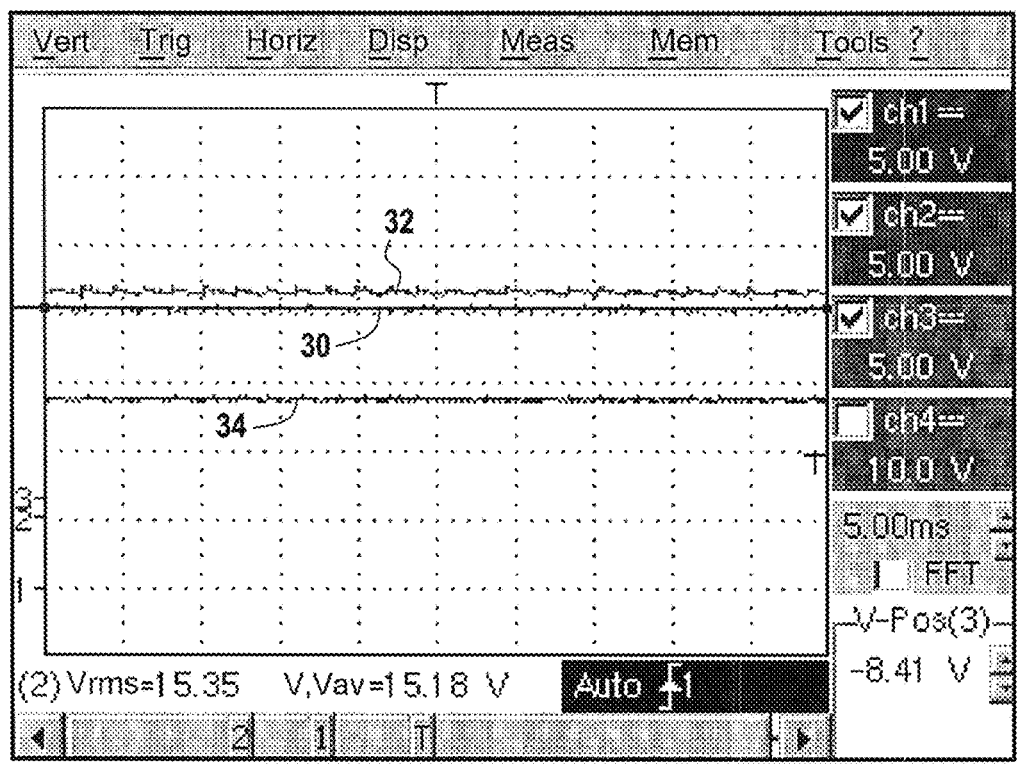
FIG. 2 shows various waveforms obtained at the output from the FIG. 1 power supply in the absence of load.

Thus, under steady conditions, only the main regulator Z9 contributes to controlling the primary and to transferring energy to the secondary, the auxiliary regulator Z10 seeing a voltage that is less than its setpoint and therefore taking no current from the summing node K. In contrast, under transient conditions, such as when starting or in the event of the load being switched off, the setpoint can be exceeded and the auxiliary regulator Z10 "takes over", and because of its short time constant (capacitor C12 is of small capacitance and the image output is loaded by fixed resistances) it can correct the primary before any intervention by the main regulator Z9. Voltage regulation thus becomes possible without interrupting the chopping. The various waveforms of FIG. 2 show this feature clearly, with the curve 32 corresponding to the main output, the curve 30 corresponding to the auxiliary output, and the curve 34 to the power supply voltage of the controller Z6, which is kept perfectly constant (in comparison with the above-mentioned curve 12 of a prior art power supply without an auxiliary regulator).

Likewise, when the power supply is connected to a single-phase network or to a polyphase network with one of its phases missing, the rectified voltage describes sinewave arches with passes through zero that are periodic (depending on the frequency of the network). Thus, when the current absorbed by the load is constant, the current transmitted by the optocoupler Z8, which is the image of the current supplied to the load, is also constant. This current, which forms the setpoint for the controller Z6, varies little in time because the time constant of the integrator Z9 is much greater than one mains half-period, such that during a mains alteration low, the current ramps produced by the controller Z6 cannot reach this fixed setpoint. The voltage across the terminals of the primary circuit becomes low and then zero, and the primary self-inductance of the transformer can no longer be charged during the time available.

In the invention, provision is thus also made to reduce the setpoint for the current ramps (and thus the demand for energy) during the mains alternation low by means of a current takeoff circuit that is configured to reduce or zero at certain instants the sum of the first and second control currents delivered to the controller Z6 in proportion with the amplitude of the low, when below a determined threshold for the input voltage. This threshold is modulated by the arches of the rectified mains voltage and then transformed into current by a transistor T2. More precisely, this determined threshold is defined by a voltage divider bridge R9, R10 feeding the base of the transistor T2 (the diode D15 being present to compensate for the base-emitter threshold voltage Vbe of the transistor T2), the collector of the transistor being connected in series with a Schottky diode D16 to take off control current at the input of the controller Z6. The transistor T2 is current controlled via a resistor R11 by an amplifier Z7 that amplifies a voltage proportional to the rectified mains (attenuated voltage arches) produced by another voltage divider bridge R6, R7.

Figure 3:
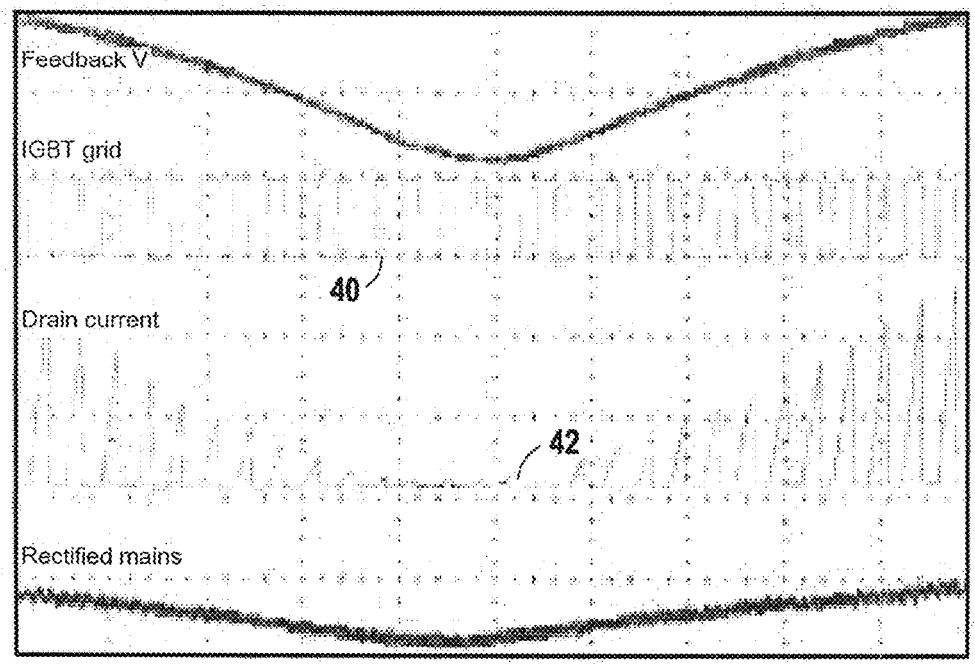
FIG. 3 shows the various waveforms obtained from the FIG. 1 power supply in the absence of one phase of a three-phase network, or in the presence of a single-phase network.
Figure 4:
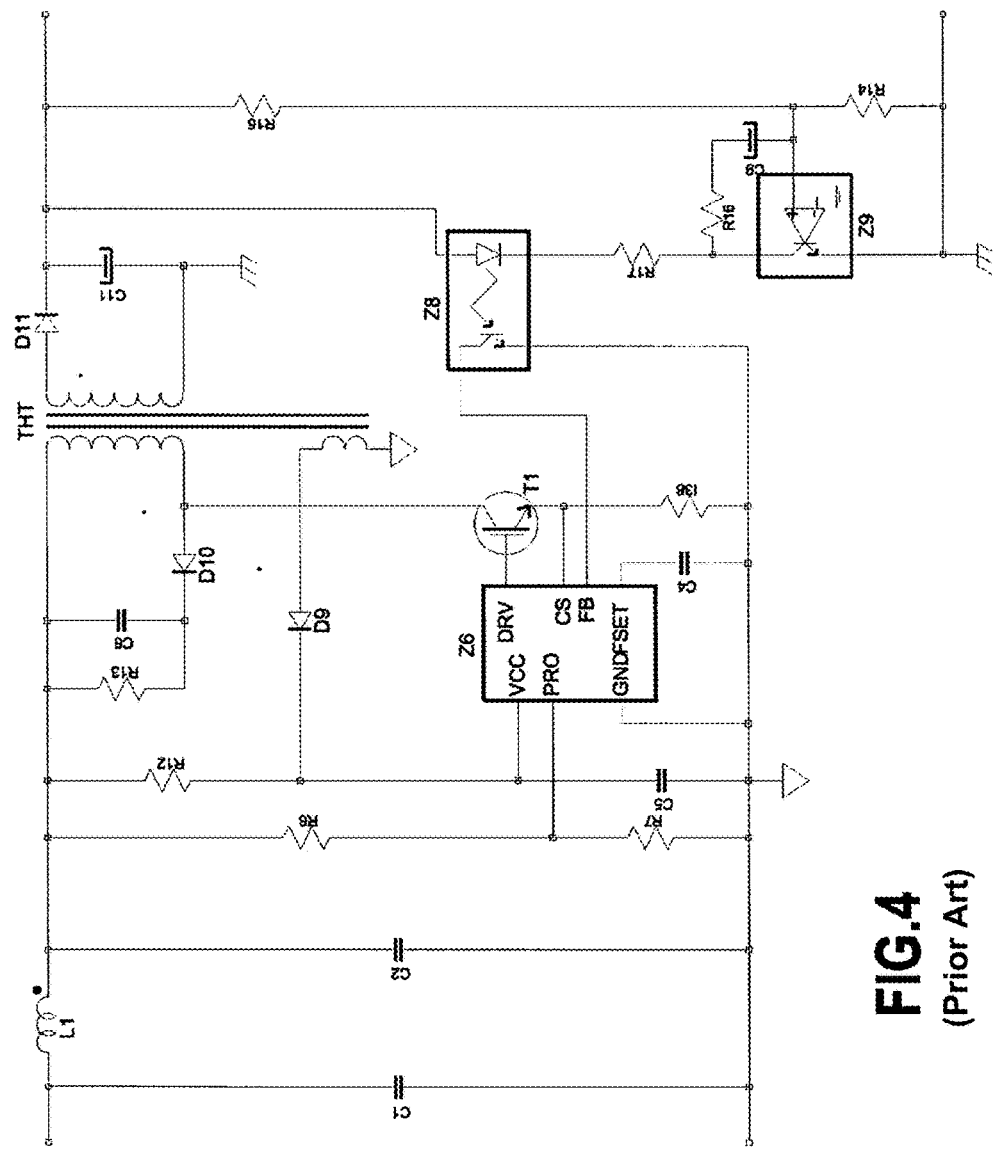
FIG. 4 shows an example of a prior art electrical power supply.
Figure 5:
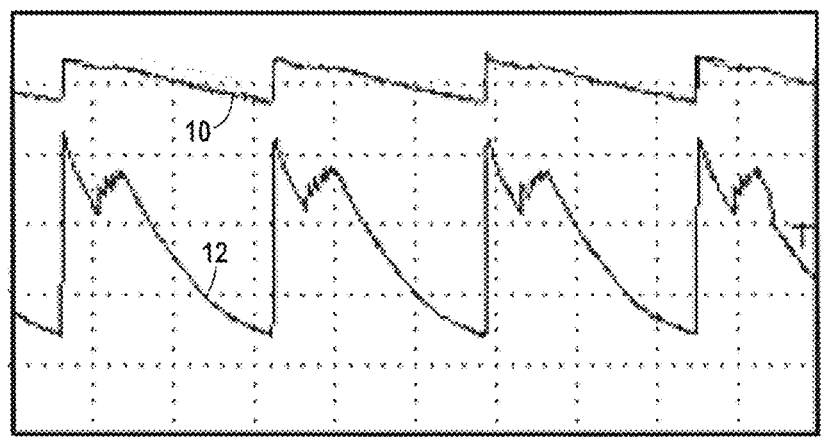
FIG. 5 shows various waveforms obtained from the FIG. 4 power supply in the absence of load.
Figure 6:
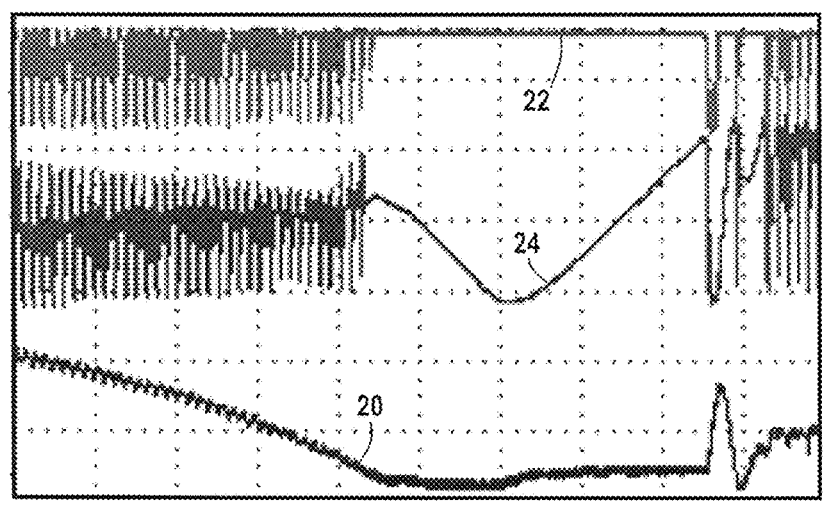
FIG. 6 shows the various waveforms obtained in the FIG. 4 power supply in the absence of a mains phase.

Thus, without disturbing the main controller Z9, the ramp duration at the mains zero crossing is completely eliminated by modulating the current setpoint. Chopping is thus constantly maintained, as shown by curve 40 in FIG. 3. This amounts to ensuring that the demand for power to be transferred to the secondary is reduced and then zero and then increased again progressively on leaving this mains low (see curve 42 in FIG. 6 showing the control current for the switch element). The input and negative feedback capacitors C3 and C7 of the amplifier Z7 serve to filter the chopping residue present on the rectified mains so that it does not disturb operation.

For this purpose, the rectified mains is advantageously taken from a protection circuit for connection to the energy distribution network via the terminal block of the measuring instrument that the switch mode power supply powers. This protection circuit is tolerant in the face of connection errors in that it always presents the same level of protection against surges regardless of any reasonably expectable connection error, such as a missing phase or interchanging a phase and neutral.

In the invention, the protection circuit that delivers the input voltage from a polyphase energy distribution network with a neutral conductor via a rectifier bridge having diodes D1 to D8, presents a star connection configuration with each of the branches of the star including in series a varistor VAR2 to VAR4 and a protection thyristor Z2 to Z4 (e.g. a SIDACtor□ from the supplier Littelfuse) and the point where the branches join is connected to the neutral conductor, likewise via a varistor VAR1 and a protection thyristor Z1 connected in series. Thus, whatever the discharge configurations (phase/phase, phase/neutral), two thyristors are in series, thereby providing a capacity for absorption that is equal to that which would be had by a delta configuration, but while using half as many components (six instead of 11). Advantageously, the point where the branches join together may also be connected to ground via a varistor VAR5 and a protection thyristor Z5 connected in series.

It should be observed that the invention is described with flyback topology, however the principles used can naturally be transposed to a feed-forward topology or indeed to a push-pull topology.

The invention claimed is:

1. A switch mode power supply including a power converter, the power converter including a transformer having a primary winding connected to a primary circuit that receives an input voltage, and a secondary winding connected to a secondary circuit that delivers an output voltage to a load,
said primary circuit comprising a managing controller for operating a switch element to chop a current flowing in said primary winding so as to transfer energy selectively to said secondary winding,
said secondary circuit comprising a storage capacitor charged via a first rectifier diode and delivering to said load said energy transferred via said transformer, and a first regulator receiving said output voltage and delivering a first control current for said managing controller via an isolator element,
wherein the power supply further comprises a second regulator receiving an auxiliary output voltage that is distinct from said output voltage and that is an image of said output voltage, the auxiliary output voltage being obtained across terminals of a link capacitor having one end connected to said storage capacitor and having another end connected to a cathode of a second rectifier diode having an anode connected to said secondary winding, and
delivering a second control current for said managing controller, which second control current is added to said first control current, said second regulator being configured to avoid any interruption in the chopping of the current flowing in said primary winding.

2. The switch mode power supply according to claim 1, wherein said first and second regulators are proportional and integral regulators, said second regulator having a time constant that is at least fifty times shorter than said first regulator.

3. The switch mode power supply according to claim 2, wherein said second regulator has a setpoint that is greater than the setpoint of said first regulator and that is determined so that it is never reached in normal operation.

4. The switch mode power supply according to claim 1, wherein said auxiliary output voltage is also delivered to said first regulator instead of and replacing said output voltage.

5. The switch mode power supply according to claim 1, wherein it further comprises, in parallel with said link capacitor, two diodes connected in series.

6. The switch mode power supply according to claim 5, further comprising first and second transistors having their bases connected in series with a resistor, said first transistor being connected in parallel with said link capacitor via its emitter/collector junction, and the assembly formed by said resistor and the emitter/collector junction of said second transistor, which has its collector connected to its base, being connected in parallel with said storage capacitor.

7. The switch mode power supply according to claim 1, further comprising a current takeoff circuit configured to reduce or zero the sum of the first and second control currents delivered to said managing controller when said input voltage is below a determined threshold.

8. The switch mode power supply according to claim 7, wherein said determined threshold is defined by a voltage divider bridge feeding the base of a transistor having a collector in series with a Schottky diode for taking off said control current while preventing any current reversal.

9. The switch mode power supply according to claim 1, further comprising a protection circuit delivering said input voltage from a polyphase energy distribution network having a neutral conductor via a diode rectifier bridge, said protection circuit having a star connection configuration, each of the branches of said star including in series a varistor and a protection thyristor, and the point where said branches are joined together being connected to said neutral conductor, likewise via a varistor and a protection thyristor connected in series.

10. The switch mode power supply according to claim 1, wherein said power converter is selected from among: a flyback converter; a forward converter; and a push-pull converter.

* * * * *